US012751418B2

(12) United States Patent
Yoshinaga

(10) Patent No.: US 12,751,418 B2
(45) Date of Patent: Oct. 6, 2026

(54) ANIMAL TOILET

(71) Applicant: DAIKI Co., Ltd., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 0 days.

(21) Appl. No.: 19/087,762

(22) Filed: Mar. 24, 2025

(65) Prior Publication Data

US 2025/0212835 A1 Jul. 3, 2025

Related U.S. Application Data

(63) Continuation of application No. PCT/JP2023/029590, filed on Aug. 16, 2023.

(30) Foreign Application Priority Data

Oct. 25, 2022 (JP) ................................ 2022-170274

(51) Int. Cl.
*A01K 1/01* (2006.01)

(52) U.S. Cl.
CPC .................................. *A01K 1/0114* (2013.01)

(58) Field of Classification Search
CPC ............................ A01K 1/0107; A01K 1/0114
USPC .......................................................... 119/166
See application file for complete search history.

(56) References Cited

U.S. PATENT DOCUMENTS

| | | | | |
|---|---|---|---|---|
| 2008/0210770 A1 | 9/2008 | Dever et al. | | |
| 2011/0011779 A1* | 1/2011 | Riccardi | A01K 1/01 | 209/419 |
| 2018/0020635 A1* | 1/2018 | Huang | A01K 1/0114 | 119/166 |
| 2022/0183251 A1* | 6/2022 | Yoshinaga | A01K 1/0114 | |
| 2023/0217890 A1* | 7/2023 | Yoshinaga | A01K 1/015 | 119/165 |
| 2024/0188530 A1* | 6/2024 | Yoshinaga | A01K 1/0052 | |

FOREIGN PATENT DOCUMENTS

JP 2003-180182 A 7/2003

OTHER PUBLICATIONS

Jun. 4, 2026 Office Action issued in Chinese Patent Application No. 202380063422.0.

* cited by examiner

*Primary Examiner* — Yvonne R Abbott-Lewis
(74) *Attorney, Agent, or Firm* — Oliff PLC

(57) ABSTRACT

An animal toilet includes a body portion, and a partition portion. The body portion receives excreted urine. The partition portion divides an internal space of the body portion into an upper space and a lower space. The partition portion has a plurality of through holes allowing the urine to pass therethrough. The plurality of through holes include a first through hole, and a second through hole. The second through hole is located at the same height as the first through hole and outside the first through hole. An opening area of the second through hole is smaller than an opening area of the first through hole.

20 Claims, 8 Drawing Sheets

ANIMAL TOILET

CROSS REFERENCE TO RELATED APPLICATION

This is a Continuation of International Application No. PCT/JP2023/029590 filed Aug. 16, 2023, which claims the benefit of Japanese Application No. 2022-170274 filed Oct. 25, 2022. The contents of these applications are hereby incorporated by reference in their entirety.

TECHNICAL FIELD

The present invention relates to an animal toilet.

BACKGROUND ART

A conventional animal toilet is disclosed, for example, in Patent Document 1. The animal toilet disclosed in Patent Document 1 includes a body portion (tray) that receives excreted urine, and a partition portion (drainboard) that divides the internal space of the body portion into an upper space and a lower space. The partition portion has a plurality of through holes that allow urine to pass therethrough. A plurality of low water-absorptive grains are laid in the upper space (on the partition portion). A water-absorbing sheet is disposed in the lower space. Urine excreted in the body portion moves from the upper space to the lower space via the through hole of the partition portion after passing through gaps between the grains. The urine having moved to the lower space accumulates in the lower space in a state of being absorbed by the water-absorbing sheet.

CITATION LIST

Patent Document

Patent Document 1: JP 2003-180182 A

SUMMARY OF INVENTION

Technical Problem

In the animal toilet described above, an odor generated from the urine accumulating in the lower space sometimes leaks into the upper space via the through hole. This causes a malodor drifting around the animal toilet. In order to restrain the odor from leaking, it is conceivable to reduce the opening area of each through hole. However, reducing the opening area of each through hole prevents urine from moving smoothly from the upper space to the lower space.

Solution to Problem

The present invention has been made in view of the above-described problem, and it is an object thereof to provide an animal toilet that is suitable for restraining an odor from leaking from a lower space into an upper space without preventing urine from moving smoothly from the upper space to the lower space.

An animal toilet according to the present invention includes: a body portion that receives excreted urine; and a partition portion that has a plurality of through holes allowing the urine to pass therethrough, and divides an internal space of the body portion into an upper space and a lower space, wherein the plurality of through holes include a first through hole, and a second through hole that is located at the same height as the first through hole and outside the first through hole, and an opening area of the second through hole is smaller than an opening area of the first through hole.

In this animal toilet, the partition portion is provided with the first and second through holes. The second through hole is located outside the first through hole. Moreover, the opening area of the second through hole is smaller than the opening area of the first through hole. By reducing the opening area of the second through hole located relatively outside in this way, an odor generated from urine accumulating in the lower space becomes less likely to leak into the upper space. On the other hand, by increasing the opening area of the first through hole, it becomes easier for urine to move smoothly from the upper space to the lower space.

Advantageous Effects of Invention

According to the present invention, it is possible to implement an animal toilet that is suitable for restraining an odor from leaking from a lower space into an upper space without preventing urine from moving smoothly from the upper space to the lower space.

DESCRIPTION OF EMBODIMENTS

Figure 1:
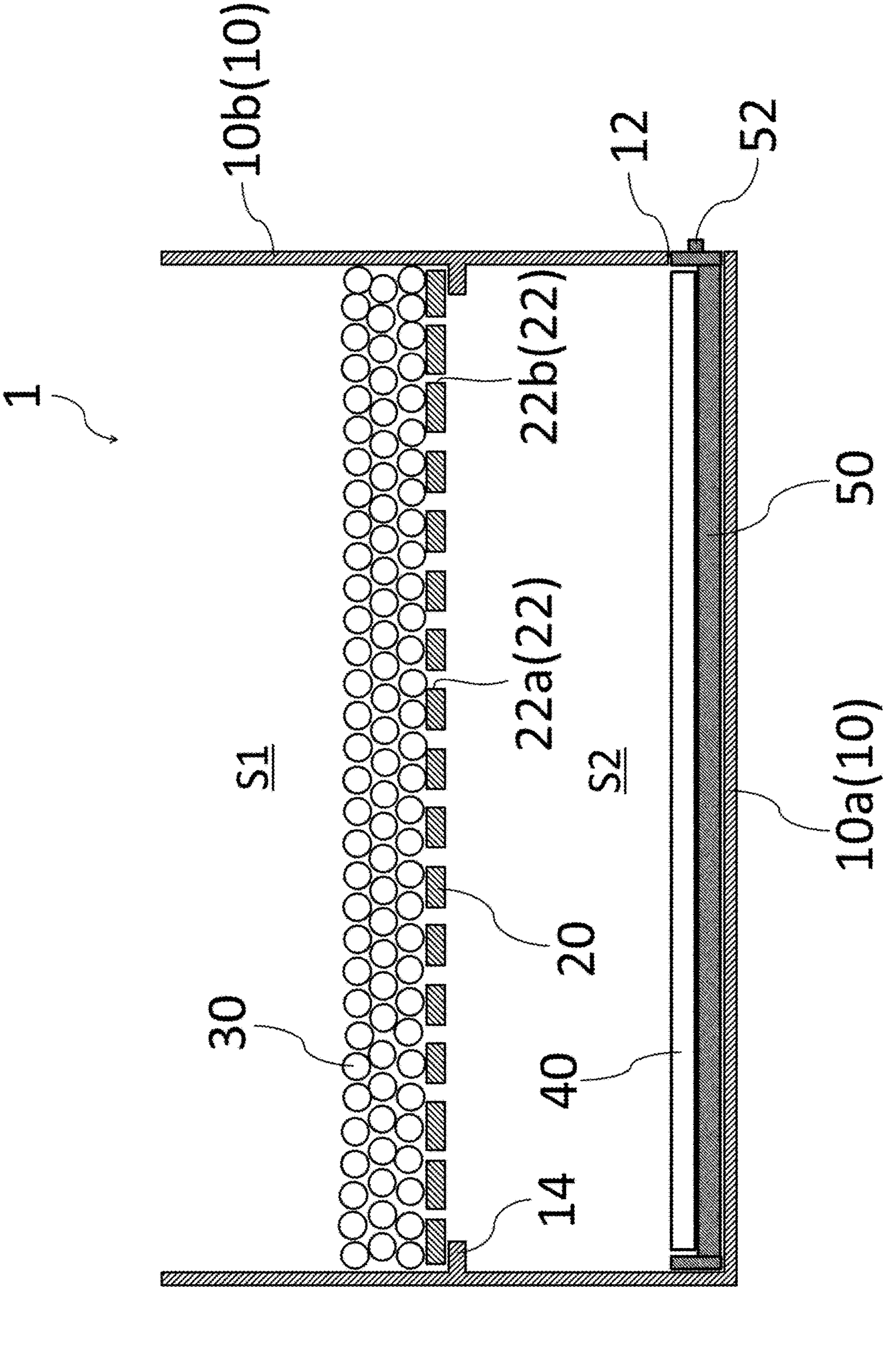
FIG. 1 is an end view showing an embodiment of an animal toilet according to the present invention.

Hereinafter, an embodiment of the present invention will be described in detail with reference to the drawings. In the description of the drawings, the same elements are given the same reference numerals, and a redundant description will be omitted.

FIG. 1 is an end view showing an embodiment of an animal toilet according to the present invention. The animal toilet 1 includes a body portion 10, a partition portion 20, a plurality of grains 30, a water-absorbing sheet 40, and a drawer portion 50. The animal toilet 1 is, for example, a cat toilet. The body portion 10 is composed of one box-shaped container, and has a bottom face part 10*a* and a side face part 10*b*. The body portion 10 receives excreted urine. The outer shape of the body portion 10 is an approximately rectangular parallelepiped shape. As a material of the body portion 10, for example, plastic can be used. Examples of the plastic include polypropylene and polyethylene.

Figure 2:
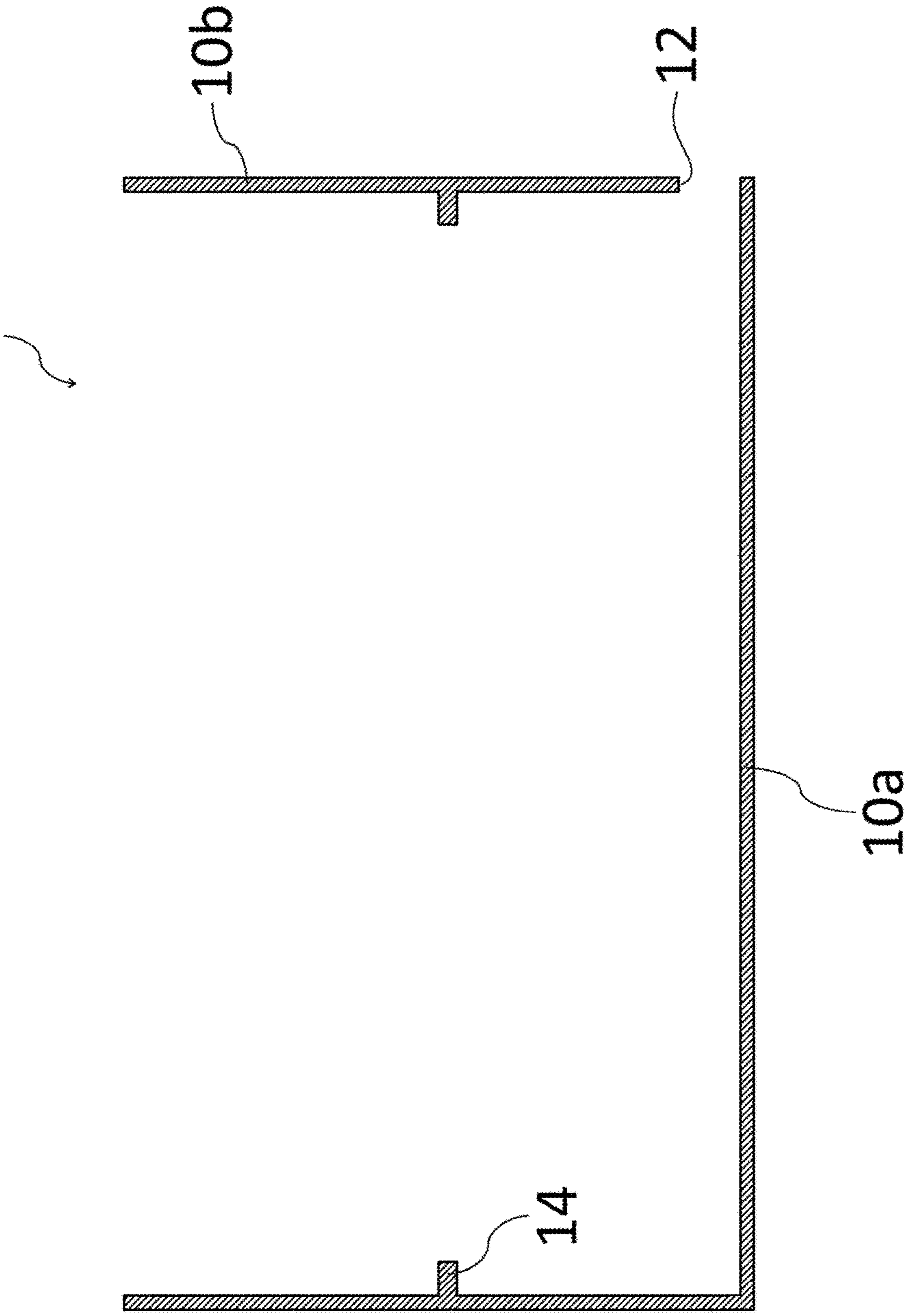
FIG. 2 is an end view showing a body portion 10.
Figure 3:
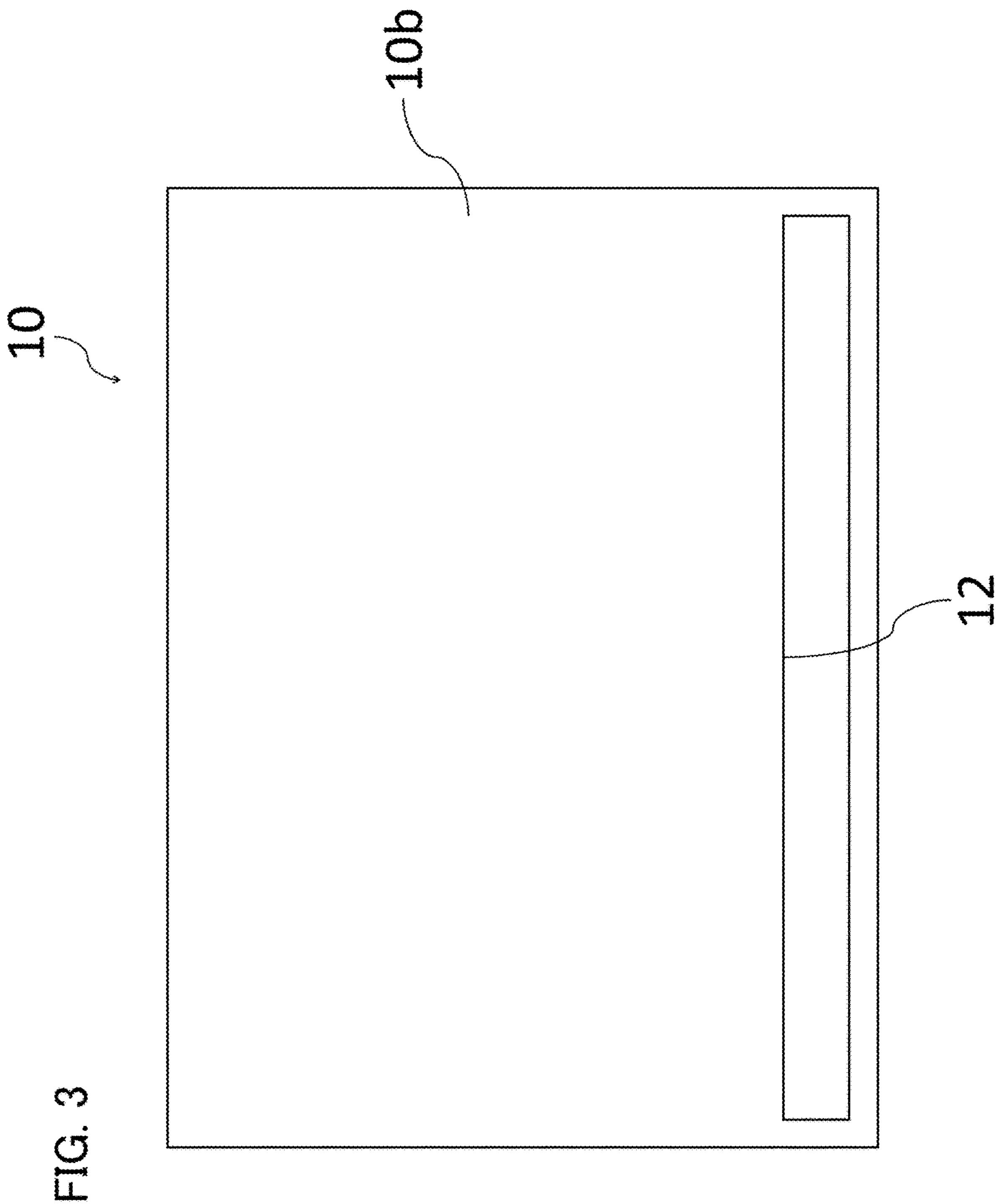
FIG. 3 is a front view showing the body portion 10.

FIG. 2 and FIG. 3 are, respectively, an end view and a front view showing the body portion 10. The opening 12 for inserting and extracting the drawer portion 50 is formed in the side face part 10*b* of the body portion 10. The opening 12 is located near the bottom face part 10*a*, and has a horizontally long rectangular shape. The length in the horizontal direction (left/right direction in FIG. 3) of the opening 12 is nearly equal to the breadth (inner size) of the body portion 10, and is, for example, between 20 cm and 40 cm inclusive. The length in the vertical direction (top/bottom direction in FIG. 3) of the opening 12 is, for example, between 2 cm and 5 cm inclusive.

Figure 4:
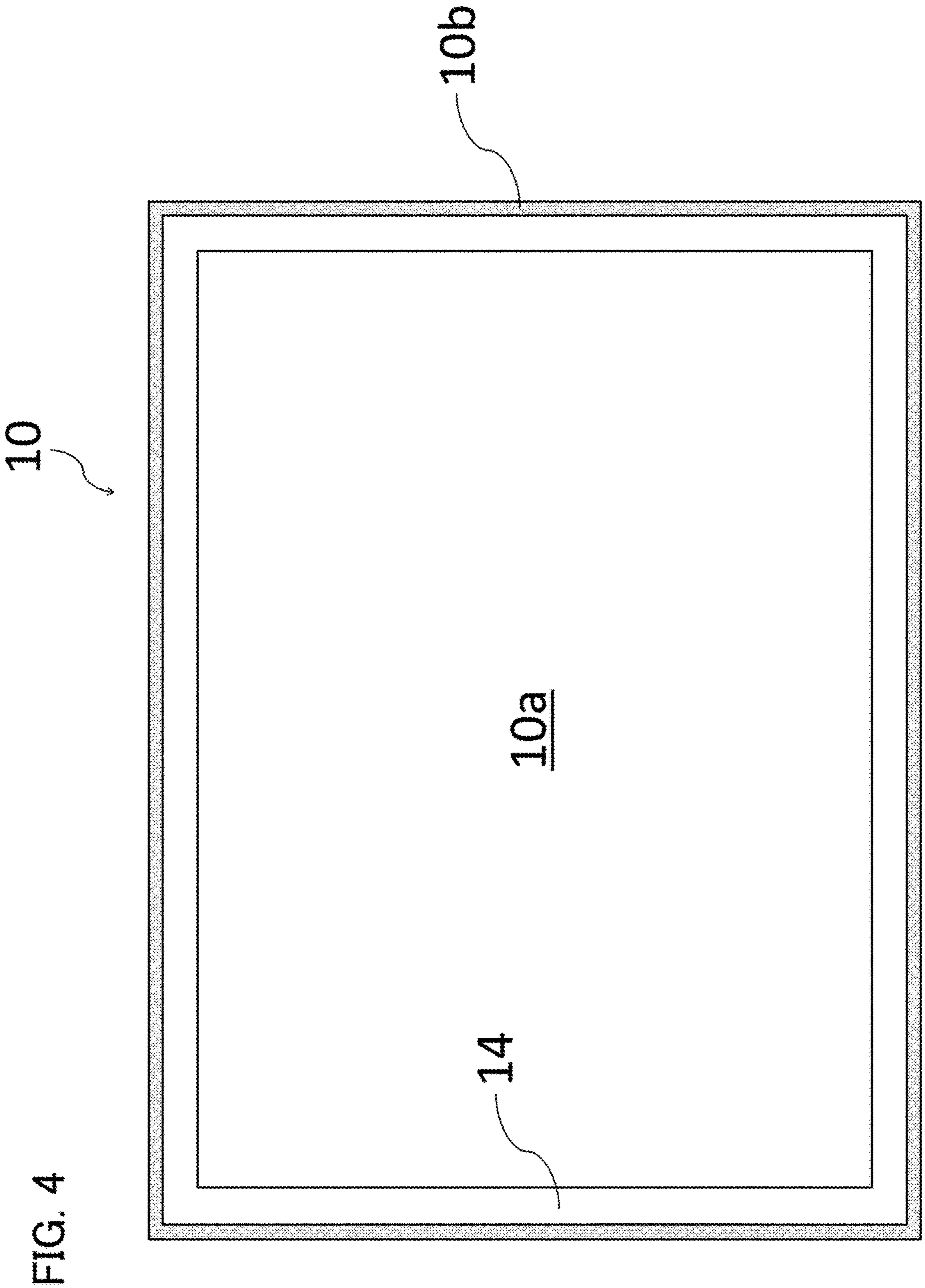
FIG. 4 is a plane view showing the body portion 10.

FIG. 4 is a plane view showing the body portion 10. The body portion 10 has a support part 14. The support part 14 projects from the side face part 10*b* toward the inside of the body portion 10. The support part 14 supports the partition portion 20 from below. The support part 14 is provided over the entirety of the inner periphery of the side face part 10*b* in a plane view. That is, the support part 14 is composed of a projected rim that is provided annularly along the inner periphery of the side face part 10*b*. The inner periphery of the side face part 10*b* has an approximately rectangular shape in a plane view. As used herein, "approximately rectangular shape" means that the shape includes not only a rectangle but also a shape similar to a rectangle such as a round corner rectangle. The projecting length of the support part 14 (the length in the direction perpendicular to the inner surface of the side face part 10*b* provided with the support part 14) is, for example, between 5 mm and 15 mm inclusive. The support part 14 may be formed integrally with the side face part 10*b*, or may be attached to the side face part 10*b* after being formed separately from the side face part 10*b*.

Figure 5:
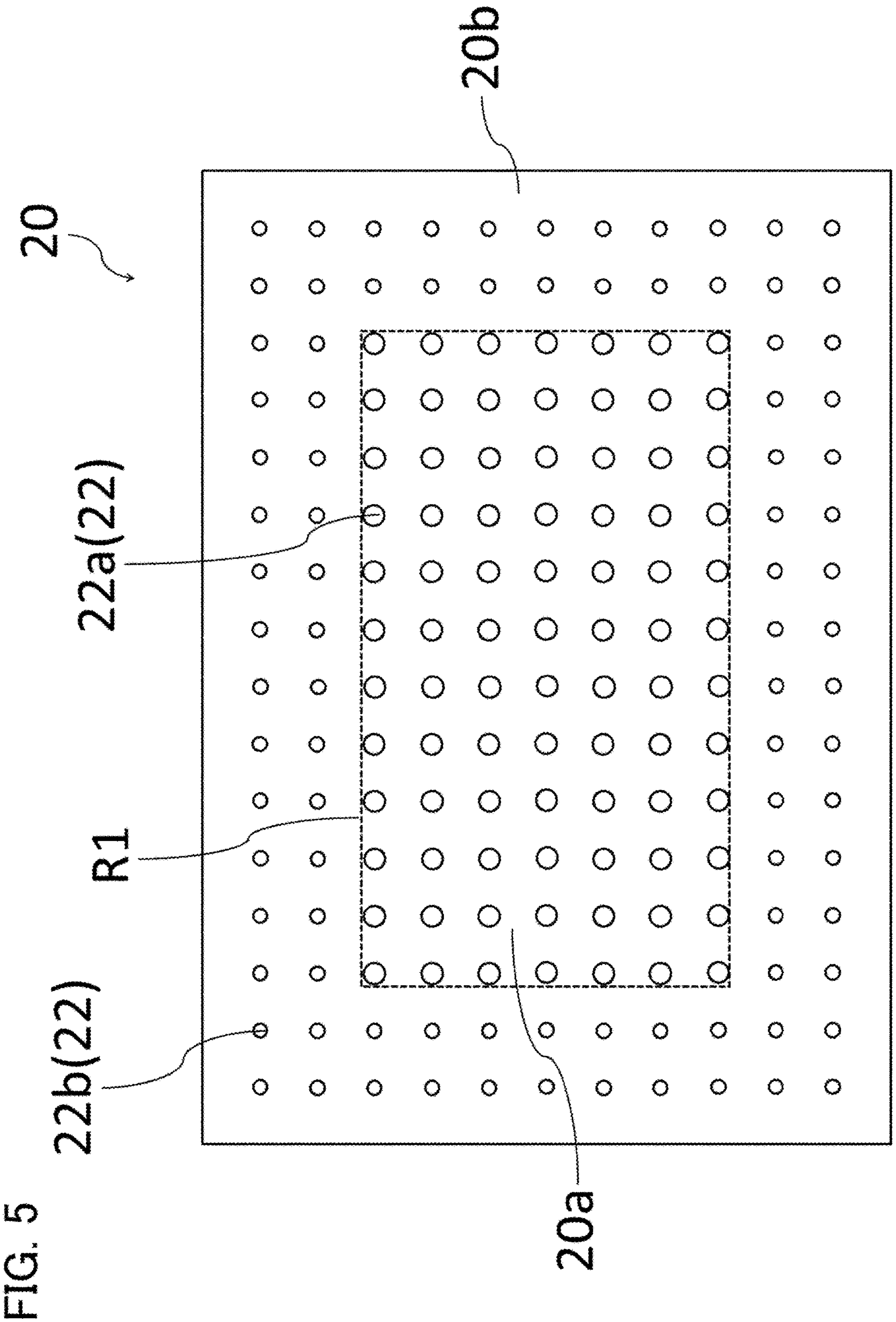
FIG. 5 is a plane view showing a partition portion 20.

FIG. 5 is a plane view showing a partition portion 20. The partition portion 20 is placed on the support part 14. The partition portion 20 is not fixed to the body portion 10. The partition portion 20 is detachable relative to the body portion 10. The partition portion 20 is capable of being disposed in the body portion 10 in a state in which the entire periphery of the partition portion 20 is apart from the side face part 10*b*. The partition portion 20 is composed of a plate-shaped member, and has a flat plate shape. Therefore, the entirety of the upper surface of the partition portion 20 is in the same plane, and also the entirety of the lower surface of the partition portion 20 is in the same plane. The partition portion 20 has an approximately rectangular shape in a plane view. The partition portion 20 is disposed parallel with the bottom face part 10*a*. Moreover, the partition portion 20 is disposed at a position apart from both the upper end of the body portion 10 (side face part 10*b*) and the water-absorbing sheet 40. Thus, the partition portion 20 divides the internal space of the body portion 10 into an upper space S1 and a lower space S2. The upper space S1 is present above the partition portion 20, and is a space in which the plurality of grains 30 are laid. The lower space S2 is present below the partition portion 20, and is a space in which urine accumulates. As a material of the partition portion 20, for example, plastic can be used.

The partition portion 20 has a plurality of through holes 22 that allow urine to pass therethrough. In the descriptions below, "plurality of through holes 22" refers to all of the through holes 22 provided in the partition portion 20 unless otherwise indicated. Each through hole 22 allows urine to pass therethrough, but does not allow the grain 30 to pass therethrough. The plurality of through holes 22 are arranged in a lattice pattern in the partition portion 20.

The plurality of through holes 22 include a through hole 22*a* (first through hole), and a through hole 22*b* (second through hole). In the present embodiment, the plurality of through holes 22 are composed only of the through hole 22*a* and the through hole 22*b*. The shape of the through hole 22*b* is similar to the shape of the through hole 22*a* in a plane view. In the present embodiment, the plane shape of each of the through holes 22*a*, 22*b* is a circle. The plurality of through holes 22 are located at the same height. That is, the distance from each through hole 22 to the bottom face part 10*a* is constant. Therefore, the through hole 22*b* is located at the same height as the through hole 22*a*. However, the through hole 22*b* is located outside the through hole 22*a*. That is, the shortest distance from the through hole 22*b* to the periphery of the partition portion 20 is smaller than the shortest distance from the through hole 22*a* to the periphery of the partition portion 20 in a plane view.

The opening area of the through hole 22*b* is smaller than the opening area of the through hole 22*a*. As used herein, the opening area is defined as the area of the opening part of each through hole 22 in a plane view (see FIG. 5). The opening area of the through hole 22*b* is preferably half or less, and more preferably a quarter or less of the opening area of the through hole 22*a*. The partition portion 20 has a plurality of the through holes 22*a*, and a plurality of the through holes 22*b*. The number of the through holes 22*a* is preferably between 30% and 70% inclusive, and more preferably between 40% and 60% inclusive of the total number of the through holes 22*a* and the through holes 22*b*.

The through holes 22*a* and the through holes 22*b* are provided, respectively, in a central part 20*a* and a surrounding part 20*b* of the partition portion 20. All of the through holes 22*a* are provided in the central part 20*a*, and all of the through holes 22*b* are provided in the surrounding part 20*b*. The central part 20*a* is the part that is enclosed by the minimum imaginary rectangle R1 that can include all through holes 22*a* in a plane view. The long side and the short side of the rectangle R1 are parallel, respectively, with the long side and the short side of the partition portion 20. The center of the central part 20*a* coincides with the center of the partition portion 20 in a plane view. The surrounding part 20*b* is the part other than the central part 20*a* in the partition portion 20, and surrounds the entirety of the central part 20*a*. The area ratio of the central part 20*a* with respect to the partition portion 20 in a plane view is preferably between 20% and 60% inclusive, and more preferably between 30% and 50% inclusive.

The plurality of grains 30 for treating excrement (mainly urine) are laid in the upper space S1 of the body portion 10. The plurality of grains 30 are laid directly on the partition portion 20. Each grain 30 has a granular shape. Examples of the granular shape include a sphere, column, and ellipsoid. The particle diameter of each grain 30 is, for example, between 5 mm and 20 mm inclusive. As used herein, the particle diameter of the grain 30 is defined as the diameter of the minimum sphere that can include the grain 30. When the animal toilet 1 is used, the grains 30 directly receive excrement.

The grains 30 have a hydrophobic property. That is, the grains 30 have the property of not absorbing liquid such as urine at all, or hardly absorbing it. The hydrophobic grains 30 do not form an agglomeration that is composed of grains bonded to each other when wet with urine, unlike water-absorbent grains.

The grains 30 having the hydrophobic property require the liquid passing rate of 60% or more measured by the following test. First, approximate 50 grams of the grains 30 (sample) are placed in a sieve with the inner diameter of 10 cm and the mesh size of 1 mm. An empty beaker is set under the sieve. Then, 30 ml of water is dripped on the sample over 10 seconds using a syringe with the inner diameter of its outer cylinder of 3 cm and the inner diameter of its cylinder tip of 4 mm (60 ml syringe manufactured by Terumo Corp.). After waiting 1 minute, the quantity of the water in the beaker is measured. The ratio of the measured water quantity with respect to the quantity of the dripped water (30 ml) shall be the liquid passing rate. At this time, if the water quantity in the beaker is 18 ml or more, the liquid passing rate is 60% or more, and therefore the grains 30 are found to have the hydrophobic property.

Each grain 30 preferably contains an organic substance as its main material. As used herein, the main material of the grain 30 refers to the material that accounts for the highest weight ratio in the grain 30, out of one or more materials constituting the grain 30. Examples of the organic substance include papers, plants, plastics, and organic sludge. Each grain 30 may be made only of an organic substance, or may be made of an organic substance and an inorganic substance.

The papers refer to a material made mainly of pulp. As the papers, in addition to ordinary paper (paper powder), for example, photographic paper, release paper, fluff pulp, paper derived from vinyl chloride wallpaper (paper generated during manufacturing or classifying vinyl chloride wallpaper), paper derived from a gypsum board (paper generated during manufacturing or classifying a gypsum board), or paper derived from a sanitary article (paper generated during manufacturing or classifying a sanitary article that contains paper) can be used. Examples of the sanitary article containing paper include paper diapers, sanitary napkins, urine absorbing pads, and sanitary paper (tissue paper, toilet paper, paper towels, or the like). As the plants, for example, wood powder, sawdust, or a plant residue (used tea leaves, bean curd lees, or the like) can be used. As the plastics, in addition to ordinary plastic, for example, an aluminum deposited film, plastic derived from vinyl chloride wallpaper (plastic generated during manufacturing or classifying vinyl chloride wallpaper), or plastic derived from a sanitary article (plastic generated during manufacturing or classifying a sanitary article that contains plastic) can be used. Examples of the sanitary article containing plastic include paper diapers, sanitary napkins, urine absorbing pads, and sanitary masks. As the organic sludge, for example, papermaking sludge, or pulp sludge can be used. These materials may be, or may not be subjected to hydrophobic treatment (water repellency treatment).

The material(s) constituting the grain 30 may be only one material, or two or more materials. In the former case, the main material described above is the only material constituting the grain 30. In the latter case, the grain 30 is made of a mixture of the main material and other material(s). Examples of the other material include gypsum and baking soda. Adding gypsum or baking soda makes it easier to give a hydrophobic property to the grain 30. The ratio of gypsum or baking soda is, for example, 5 wt. % or more and less than 50 wt. % with respect to the entirety of the grain 30.

The grains 30 can be manufactured by, for example, the following method. First, granules that will serve as the grains 30 are formed by granulating a granulating material (the material(s) constituting the grains 30) with a granulation apparatus. As the granulation apparatus, for example, an extrusion granulator can be used. The granules may be subjected to hydrophobic treatment as needed. The hydrophobic treatment can be performed by, for example, coating the surfaces of the granules with a hydrophobic agent (water repellent agent). In the case where the hydrophobic treatment is not performed, it is preferable that crevices are prevented from forming in the granules as much as possible by increasing the pressure that is applied to the granulating material during granulation. This is because the crevices serve as a path through which liquid such as urine enters inside the grains 30. Prior to the granulation, pretreatment such as pulverization, kneading, and adding water is performed on the granulating material as needed. Also, after the granulation, posttreatment such as sieving (sizing), and drying is performed as needed.

The water-absorbing sheet 40 is disposed in the lower space S2 of the body portion 10. The water-absorbing sheet 40 absorbs urine that has passed through the through holes 22 of the partition portion 20. That is, the urine having passed through the through holes 22 accumulates in the lower space S2 in the state of being absorbed by the water-absorbing sheet 40.

Figure 6:
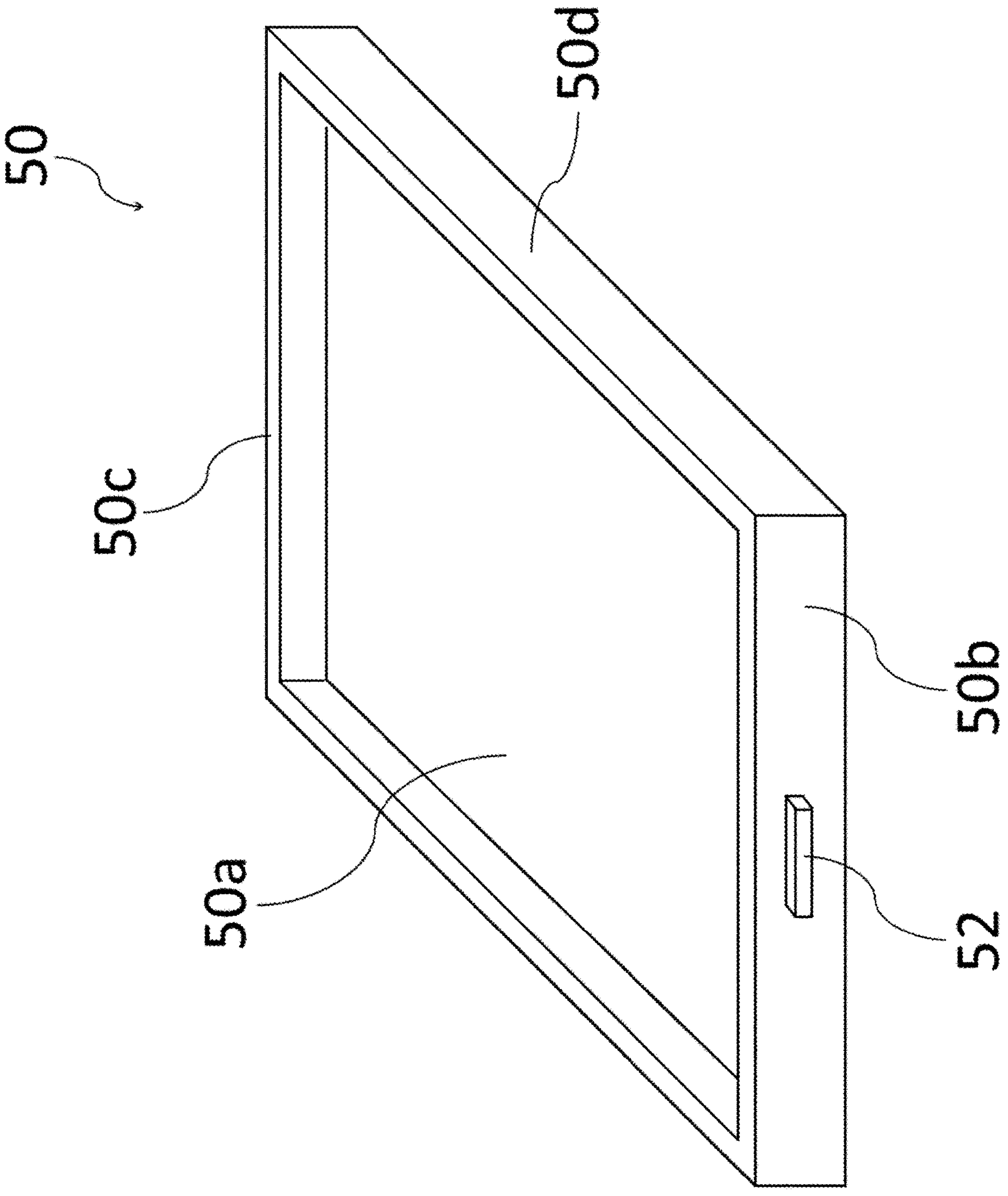
FIG. 6 is a perspective view showing a drawer portion 50.

FIG. 6 is a perspective view showing the drawer portion 50. The drawer portion 50 has a bottom board 50*a*, a front board 50*b*, a rear board 50*c*, and a pair of side boards 50*d*. The size of the bottom board 50*a* is nearly equal to the size of the bottom face part 10*a* of the body portion 10. The front board 50*b* has nearly the same shape and size as the opening 12. A grip 52 is attached to the front board 50*b*. The drawer portion 50 is capable of being inserted in and extracted from the body portion 10 through the opening 12. The drawer portion 50 houses the water-absorbing sheet 40. That is, the water-absorbing sheet 40 is disposed in the body portion 10 in the state of being housed in the drawer portion 50. As a material of the drawer portion 50, for example, plastic can be used.

When the animal toilet 1 is used, urine excreted in the body portion 10 moves from the upper space S1 to the lower space S2 via the through holes 22 of the partition portion 20 after passing through gaps between the grains 30. The urine having moved to the lower space S2 is absorbed by the water-absorbing sheet 40.

The effects of the animal toilet 1 will be described. In the animal toilet 1, the partition portion 20 is provided with the through hole 22*a* and the through hole 22*b*. The through hole 22*b* is located outside the through hole 22*a*. Moreover, the opening area of the through hole 22*b* is smaller than the opening area of the through hole 22*a*. By reducing the opening area of the through hole 22*b* located relatively outside in this way, an odor generated from urine accumulating in the lower space S2 becomes less likely to leak into the upper space S1. That is because an odor is more likely to pass through the through hole 22*b* located relatively outside than the through hole 22*a* located relatively inside due to the odor having a tendency to rise particularly along the side face part 10*b* of the body portion 10. On the other hand, by increasing the opening area of the through hole 22*a*, it becomes easier for urine to move smoothly from the upper space S1 to the lower space S2. Accordingly, the animal toilet 1 is implemented that is suitable for restraining an odor from leaking from the lower space S2 into the upper space S1 without preventing urine from moving smoothly from the upper space S1 to the lower space S2.

From the viewpoint of restraining an odor from leaking without preventing urine from moving smoothly in this way, the opening area of the through hole 22*b* is preferably half or less, and more preferably a quarter or less of the opening area of the through hole 22*a*. On the other hand, if the ratio is too small, the possible range of designing the opening area of each through hole 22*a*, 22*b* becomes narrower, which may hinder manufacturing of the animal toilet 1. From this viewpoint, the opening area of the through hole 22*b* is preferably an eighth or more of the opening area of the through hole 22*a*.

The shape of the through hole 22*b* is similar to the shape of the through hole 22*a* in a plane view. By making the shapes of the through hole 22*a* and the through hole 22*b* similar to each other in this way, it is possible to enhance the aesthetic appearances of the partition portion 20 and eventually the animal toilet 1. However, the shape of the through hole 22*b* may not be similar to the shape of the through hole 22*a* in a plane view.

The partition portion 20 has a flat plate shape. Thus, the partition portion 20 becomes easy to form. This contributes to reducing the manufacturing costs of the partition portion 20 and eventually the animal toilet 1.

The through holes 22*a* are provided in the central part 20*a* of the partition portion 20, and the through holes 22*b* are provided in the surrounding part 20*b* of the partition portion 20. By neatly distinguishing between the region in which the through holes 22*a* are disposed and the region in which the through holes 22*b* are disposed, it is possible to enhance the aesthetic appearances of the partition portion 20 and eventually the animal toilet 1.

Reducing the area of the central part 20*a* provided with the through holes 22*a* is advantageous for restraining an odor from leaking from the lower space S2 into the upper space S1. From this viewpoint, the area ratio of the central part 20*a* with respect to the partition portion 20 in a plane view is preferably 60% or less, and more preferably 50% or less. On the other hand, if the area of the central part 20*a* is too small, it becomes difficult for urine to move smoothly from the upper space S1 to the lower space S2. From this viewpoint, the above-described area ratio is preferably 20% or more, and more preferably 30% or more.

Reducing the number of the through holes 22*a* is advantageous for restraining an odor from leaking from the lower space S2 into the upper space S1. From this viewpoint, the number of the through holes 22*a* is preferably 70% or less, and more preferably 60% or less of the total number of the through holes 22*a* and the through holes 22*b*. On the other hand, if the number of the through holes 22*a* is too small, it becomes difficult for urine to move smoothly from the upper space S1 to the lower space S2. From this viewpoint, the number of the through holes 22*a* is preferably 30% or more, and more preferably 40% or more.

The grains 30 have a hydrophobic property. In this case, most of urine excreted on the grains 30 is not absorbed by the grains 30, and passes through gaps between the grains 30. Thus, the urine can be quickly guided to the lower space S2.

In the case where each grain 30 contains an organic substance as a main material, it is possible to obtain the grains 30 suitable for being disposed of by incineration. This contributes to convenience of disposal of the grains 30 after use. Particularly in the case where each grain 30 is made only of an organic substance, it is possible to obtain the grains 30 more suitable for being disposed of by incineration.

The body portion 10 is composed of one container. In this case, it is possible to implement the animal toilet 1 including the upper space S1 and the lower space S2 with simple constitution, compared to a case where the body portion 10 is composed of a plurality of containers.

The partition portion 20 is not fixed to the body portion 10. In this case, the partition portion 20 can be attached to and detached from the body portion 10 easily.

The partition portion 20 is placed on the support part 14. Thus, the partition portion 20 can stay at a predetermined position in the body portion 10 without being fixed to the body portion 10.

The support part 14 is provided over the entirety of the inner periphery of the side face part 10*b* in a plane view. Thus, it is possible to make a situation less likely to occur in which the partition portion 20 falls into the lower space S2.

The partition portion 20 is capable of being disposed in the body portion 10 in the state in which the entire periphery thereof is apart from the side face part 10*b*. By providing a margin between the partition portion 20 and the side face part 10*b* in this way, the partition portion 20 can be attached to and detached from the body portion 10 smoothly.

The water-absorbing sheet 40 is disposed in the lower space S2. Thus, urine accumulating in the lower space S2 can be confined in the water-absorbing sheet 40. For this reason, it is possible to ease generation of a malodor from the urine.

The drawer portion 50 is provided that is capable of being inserted in and extracted from the body portion 10. Thus, it is possible to easily carry out the work of replacing a used water-absorbing sheet 40 with a new one.

Incidentally, cats have the habit of hiding their excrement with grains after excretion, unlike other animals such as dogs. Therefore, the animal toilet 1 in which the plurality of grains 30 are laid in the upper space S1 is particularly suitable for being used as a cat toilet.

Figure 7:
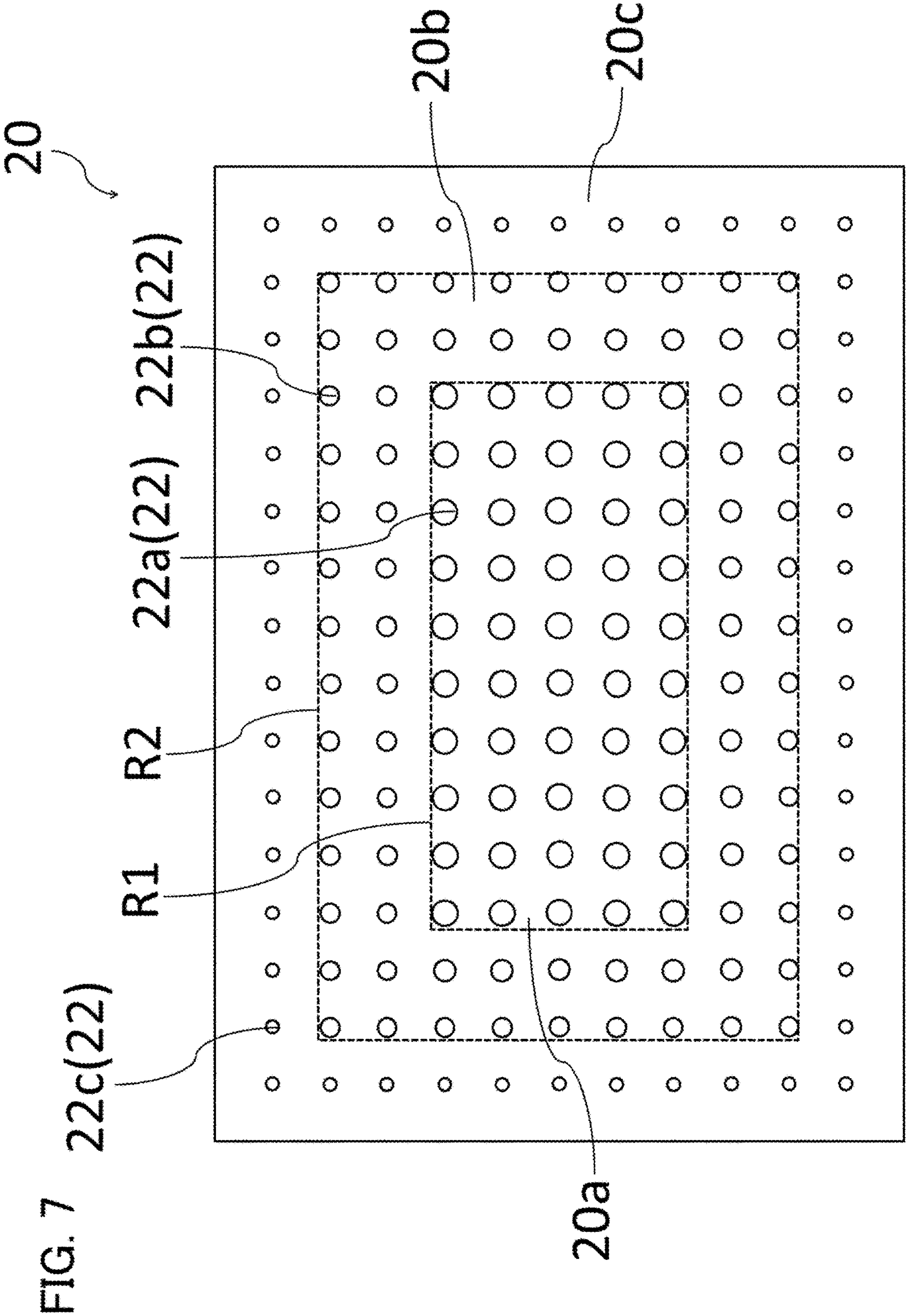
FIG. 7 is a plane view showing the partition portion 20 according to a modified example.

The present invention is not limited to the above-described embodiment, and various modifications can be made. In the above-described embodiment, an example is given in which the partition portion 20 is provided with two types of through holes 22 having mutually different opening areas (through hole 22*a* and through hole 22*b*). However, the partition portion 20 may have three or more types of through holes 22 having mutually different opening areas as shown, for example, in FIG. 7. In FIG. 7, the partition portion 20 has a through hole 22*c* (third through hole) in addition to the through hole 22*a* and the through hole 22*b*. The through hole 22*c* is located at the same height as the through hole 22*a* and the through hole 22*b* and outside the through hole 22*b*. The opening area of the through hole 22*c* is smaller than the opening area of the through hole 22*b*. The shape of the through hole 22*c* is similar to the shapes of the through hole 22*a* and the through hole 22*b* in a plane view. The partition portion 20 has a plurality of the through holes 22*c*.

The through holes 22*c* are provided in a surrounding part 20*c* of the partition portion 20. All of the through holes 22*c* are provided in the surrounding part 20*c*. In this example, the surrounding part 20*b* (first surrounding part) is the part that is enclosed by the minimum imaginary rectangle R2 that can include all through holes 22*b* in a plane view, excluding the central part 20*a*. The long side and the short side of the rectangle R2 are parallel, respectively, with the long side and the short side of the partition portion 20. The surrounding part 20*c* (second surrounding part) is the part other than the central part 20*a* and the surrounding part 20*b* in the partition portion 20, and surrounds the entirety of the surrounding part 20*b*.

In the above-described embodiment, an example is given in which the plane shape of the through hole 22 is a circle. However, the plane shape of the through hole 22 is arbitrary, and may be, for example, an ellipse, or a polygon such as a rectangle.

In the above-described embodiment, an example is given in which the drawer portion 50 is provided. However, it is not essential to provide the drawer portion 50. In the case where the drawer portion 50 is not provided, the water-absorbing sheet 40 is disposed directly on the bottom face part 10*a*. In that case, the side face part 10*b* is not provided with the opening 12 naturally.

In the above-described embodiment, an example is given in which the water-absorbing sheet 40 is disposed in the body portion 10. However, it is not essential to dispose the water-absorbing sheet 40 in the body portion 10. In the case where the water-absorbing sheet 40 is not disposed, the drawer portion 50 is also not provided.

Figure 8:
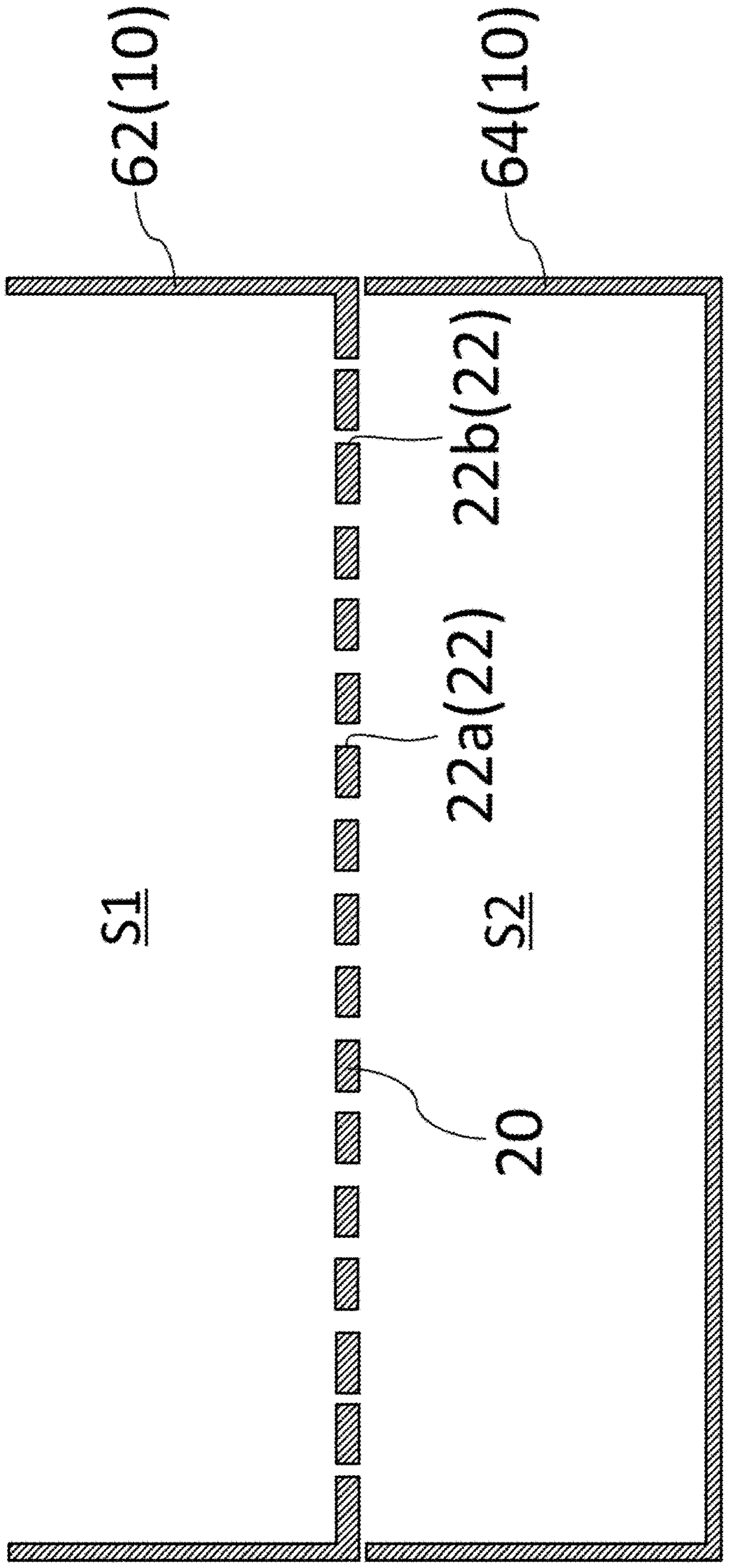
FIG. 8 is an end view for illustrating a modified example of the body portion 10.

In the above-described embodiment, an example is given in which the body portion 10 is composed of one container. However, the body portion 10 may be composed of a plurality of containers as shown, for example, in FIG. 8. In FIG. 8, the body portion 10 is composed of two containers (containers 62, 64). Each container 62, 64 has a bottom face part and a side face part, and is in a box shape. The container 62 is put on the container 64. The bottom face part of the container 62 has the through holes 22, and constitutes the partition portion 20 having a flat plate shape. Thus, the internal space of the container 62 and the internal space of the container 64 are, respectively, the upper space S1 and the lower space S2. Moreover, the bottom face part of the container 64 constitutes the bottom face part of the body portion 10, and the side face part of the container 62 and the side face part of the container 64 constitute the side face part of the body portion 10.

LIST OF REFERENCE NUMERALS

1 Animal Toilet
10 Body Portion
10*a* Bottom Face Part
10*b* Side Face Part
12 Opening
14 Support Part
20 Partition Portion
20*a* Central Part
20*b* Surrounding Part (First Surrounding Part)
20*c* Surrounding Part (Second Surrounding Part)
22 Through Hole
22*a* Through Hole (First Through Hole)
22*b* Through Hole (Second Through Hole)
22*c* Through Hole (Third Through Hole)
30 Grain
40 Water-Absorbing Sheet
50 Drawer Portion
52 Grip
62 Container
64 Container
S1 Upper Space
S2 Lower Space

The invention claimed is:

1. An animal toilet comprising:
a body portion that receives excreted urine; and
a partition portion that has a plurality of through holes allowing the urine to pass therethrough, and divides an internal space of the body portion into an upper space and a lower space,
wherein the plurality of through holes include a first through hole, and a second through hole that is located at the same height as the first through hole and outside the first through hole, and
an opening area of the second through hole is smaller than an opening area of the first through hole.

2. The animal toilet according to claim 1,
wherein the opening area of the second through hole is half or less of the opening area of the first through hole.

3. The animal toilet according to claim 2,
wherein the opening area of the second through hole is a quarter or less of the opening area of the first through hole.

4. The animal toilet according to claim 1,
wherein a shape of the second through hole is similar to a shape of the first through hole in a plane view.

5. The animal toilet according to claim 1,
wherein the partition portion has a flat plate shape.

6. The animal toilet according to claim 1,
wherein the first through hole is provided in a central part of the partition portion, and
the second through hole is provided in a surrounding part of the partition portion.

7. The animal toilet according to claim 6,
wherein an area ratio of the central part with respect to the partition portion in a plane view is between 20% and 60% inclusive.

8. The animal toilet according to claim 7,
wherein the area ratio of the central part is between 30% and 50% inclusive.

9. The animal toilet according to claim 1,
wherein the partition portion has a plurality of the first through holes, and a plurality of the second through holes.

10. The animal toilet according to claim 9,
wherein the number of the first through holes is between 30% and 70% inclusive of a total number of the first and second through holes.

11. The animal toilet according to claim 10,
wherein the number of the first through holes is between 40% and 60% inclusive of the total number of the first and second through holes.

12. The animal toilet according to claim 1,
wherein the plurality of through holes include a third through hole that is located at the same height as the first and second through holes and outside the second through hole, and
an opening area of the third through hole is smaller than the opening area of the second through hole.

13. The animal toilet according to claim 12,
wherein a shape of the third through hole is similar to shapes of the first and second through holes in a plane view.

14. The animal toilet according to claim 12,
wherein the partition portion has a plurality of the third through holes.

15. The animal toilet according to claim 1, further comprising:
a plurality of grains that are laid in the upper space, and have a hydrophobic property.

16. The animal toilet according to claim 15,
wherein each of the grains contains an organic substance as a main material.

17. The animal toilet according to claim 16,
wherein each of the grains is made only of an organic substance.

18. The animal toilet according to claim 1,
wherein the body portion is composed of one container.

19. The animal toilet according to claim 1,
wherein the partition portion is not fixed to the body portion.

20. The animal toilet according to claim 19,
wherein the body portion has a support part that projects from a side face part of the body portion toward an inside of the body portion, and
the partition portion is placed on the support part.

* * * * *